United States Patent [19]

Lagoni

[11] Patent Number: 4,982,287

[45] Date of Patent: Jan. 1, 1991

[54] CONTROL OF BRIGHTNESS LEVEL ADAPTED TO CONTROL OF CONTRAST

[75] Inventor: William A. Lagoni, Indianapolis, Ind.

[73] Assignee: RCA Licensing Corporation, Princeton, N.J.

[21] Appl. No.: 438,930

[22] Filed: Nov. 1, 1989

[51] Int. Cl.⁵ .......................... H04N 5/57; H04N 5/59
[52] U.S. Cl. ...................................... 358/168; 358/169
[58] Field of Search ............... 358/168, 169, 243, 242, 358/39

[56] References Cited

U.S. PATENT DOCUMENTS

| | | | |
|---|---|---|---|
| 3,804,981 | 4/1974 | Avins | 178/7.3 R |
| 3,928,867 | 12/1975 | Lynch | 358/39 |
| 3,961,361 | 6/1976 | Avins et al. | 358/27 |
| 4,091,419 | 5/1978 | Rhee et al. | 358/168 |
| 4,126,884 | 11/1978 | Shanley, II | 358/21 |
| 4,506,292 | 3/1985 | Newton | 358/168 |
| 4,520,397 | 5/1985 | Hibi | 358/168 |
| 4,587,554 | 5/1986 | Tamura | 358/169 |
| 4,654,717 | 3/1987 | Stoughton | 358/169 |

Primary Examiner—Tommy P. Chin
Attorney, Agent, or Firm—Joseph S. Tripoli; Peter M. Emanuel; Frederick A. Wein

[57] ABSTRACT

A level setting apparatus for adjusting the brightness of a television receiver is modified by the setting of an amplitude control apparatus for adjusting the contrast such that the maximum brightness level of the image on a CRT is modified in direct relationship to the adjusted level of contrast.

24 Claims, 3 Drawing Sheets

CONTROL OF BRIGHTNESS LEVEL ADAPTED TO CONTROL OF CONTRAST

BACKGROUND

The present invention relates to video signal processing cirucits, and in particular, to luminance signal processing circuits of a color television receiver.

In a color television receiver, it is customary to provide separate amplifying channels for the luminance and chrominance signal components of the composite color television signal. The luminance amplifier includes both contrast and brightness control circuits which are, at least to some extent, usually viewer operated. The contrast control adjusts the gain of a video amplifier to determine the peak-to-peak amplitude of the trace portion of the video or drive signal supplied to a kinescope or CRT. The brightness control typically adjusts the black level of the video signal to determin a point close to where electron beam cutoff of the CRT occurs. Typically, the adjusted black level is related to the back porch level of the video signal and the brightness is controlled by DC insertion or clamp circuits. This brightness level may correspond to optical black. However, this "black" level can be adjusted by the viewer to a higher brightness level, such as gray.

To this end, a level setting means for adjusting the brightness of a television receiver is modified by the setting of an amplitude control means for adjusting the contrast such that the maximum brightness level of the image on a CRT is modified in direct relationship to the adjusted level of contrast. In such a situation, a viewer adjustment of the contrast control often will not necessitate a corresponding viewer adjustment of the setting of the brightness control in order to maintain the apparent blackness of the dark portions of the image. The benefit of this may be understood by considering that in a bright ambient condition, the range of brightness adjustment required to make a given perceptible change in the illumination of details in dark portions of a scene is greater than the range required in a low ambient light condition. Typically, the contrast control will be set to a high level for viewing in high ambient conditions and set to a lower level for darker ambient viewing conditions. The contrast control can thus be viewed as an indicator of the viewer's perceived sensitivity to CRT light output levels.

It is not only desirable to avoid excessive brightness control range to improve the "human engineering" by providing the viewer with an optimal brightness adjustment range as discussed above, but it is also desirable to ease certain design constraints in the automatic beam limiter (ABL) unit. If excessive brightness control range is allowed, then the beam limiter is required to operate in a more complex manner to limit beam current effectively. A beam limiter senses some voltage or current having some relationship to beam current and controls some attribute of the video signal to limit the beam current to a predetermined amount. Two of the primary video characteristics which are usually controlled are contrast and brightness. To a point, controlling brightness to control beam current is a less desirable thing to do than controlling contrast in that what is changed is the DC component of the video signal and the black level, by definition, has low beam current requirements since it is "black". It is more desirable to reduce contrast. However, control over both contrast and brightness are necessary to protect against the situation where the viewer could turn the contrast as low as possible but has adjusted a wide range brightness control to a very high setting so that even with contrast very low, the CRT is still being driven to too much beam current. Typically, therefore upon the sensing excessive beam currents, the ABL unit first operates to reduce contrast; and, if the reduction of contrast does not bring the CRT beam currents within predetermined limits, the second level of operation is to reduce brightness. Thus, the design of the ABL unit needs to cover the situation of an extremely high brightness control setting at a low contrast setting which requires the ABL to exercise a wide range of brightness control.

With a wide range of viewer brightness control settings, the ABL design choices are either to have a wide range of control to adjust contrast or to have a wide range of control to adjust brightness. If the ABL is given much over a 4 or 5:1 change in contrast control capability coupled with an abnormally high viewer brightness control setting capability, the result can be an excessively washed out appearance to the picture. Thus, anything that can be done to avoid having an excessive viewer brightness control range permits having the beam limiter rely more on controlling contrast which is the preferred approach.

Thus, it is desirable to design the viewer brightness control range to be as small as practicable in order to relieve the ABL from having to compensate for the possible excessive conditions discussed above. In this manner, the present invention acts to reduce the complexity and possible errors introduced by ABL actions.

SUMMARY OF THE INVENTION

The brightness control is designed to provide the maximum range with the maximum possible brightness setting at the maximum contrast setting. It is herein recognized that when the maximum contrast setting is decreased to a lower contrast setting, the maximum range of brightness control may be more than desired. Accordingly it is recognized that it is desirable use the contrast control information to alter the range of brightness control.

DESCRIPTION OF THE DRAWINGS

For a better understanding of the present invention, reference may be had to the accompanying drawings wherein.

In the various FIGURES, like reference numerals have been applied to like members.

DETAILED DESCRIPTION OF THE PREFERRED EMBODIMENT

Figure 1:
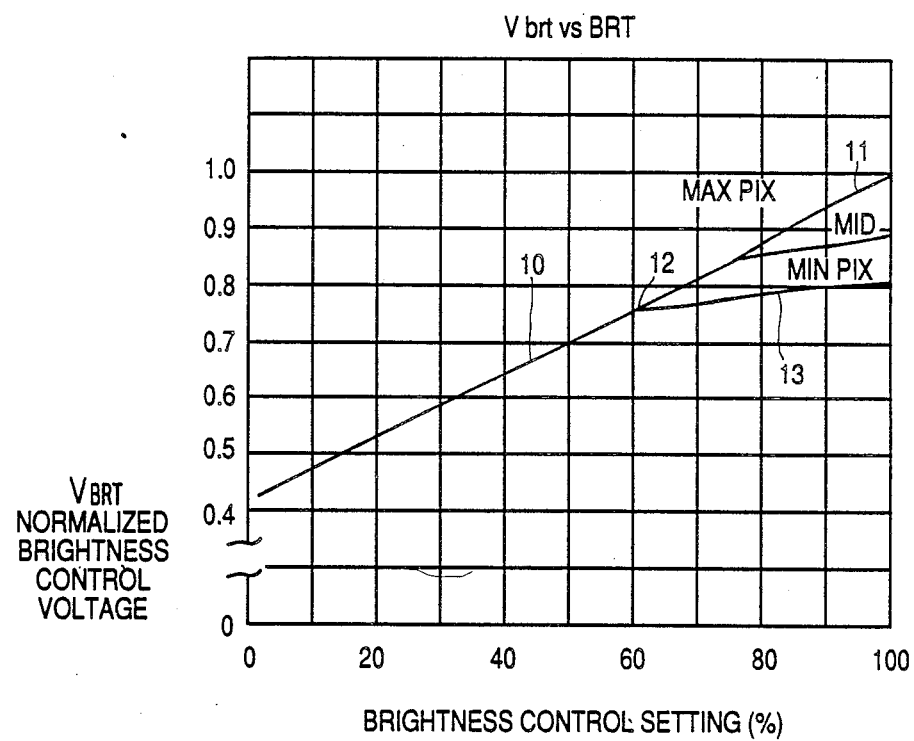
FIG. 1 is a graphic representation of the transfer function of the circuitry of the present invention.

Referring now to FIG. 1, there is shown a transfer function according to the present invention wherein the range of the brightness control is modified according to the contrast control setting. The abscissa shows a brightness control setting from zero to 100 percent and the ordinate calibrated in a normalized brightness output voltage $V_{brt}$. The transfer function of FIG. 1 has a linear constant slope portion 10, wherein the output or control voltage $V_{brt}$ increases linearly with the brightness control setting for low brightness settings regardless of the setting of the contrast control. However, for high brightness settings, beyond a point 12, the transfer function can be any of family of curves including portion 11 which is a linear continuation of portion 10 when maximum contrast is set, to portion 13 which has a reduced slope when minimum contrast is set. It should be noted that portion 13 and others of the family of curves have a slope of greater than zero. In an alternative embodiment, the family of curves may have a slope at or near to provide a sharper brightness control cutoff. However, it is believed that the reduced slope gives the viewer a better "feel" to the control.

Figure 2:
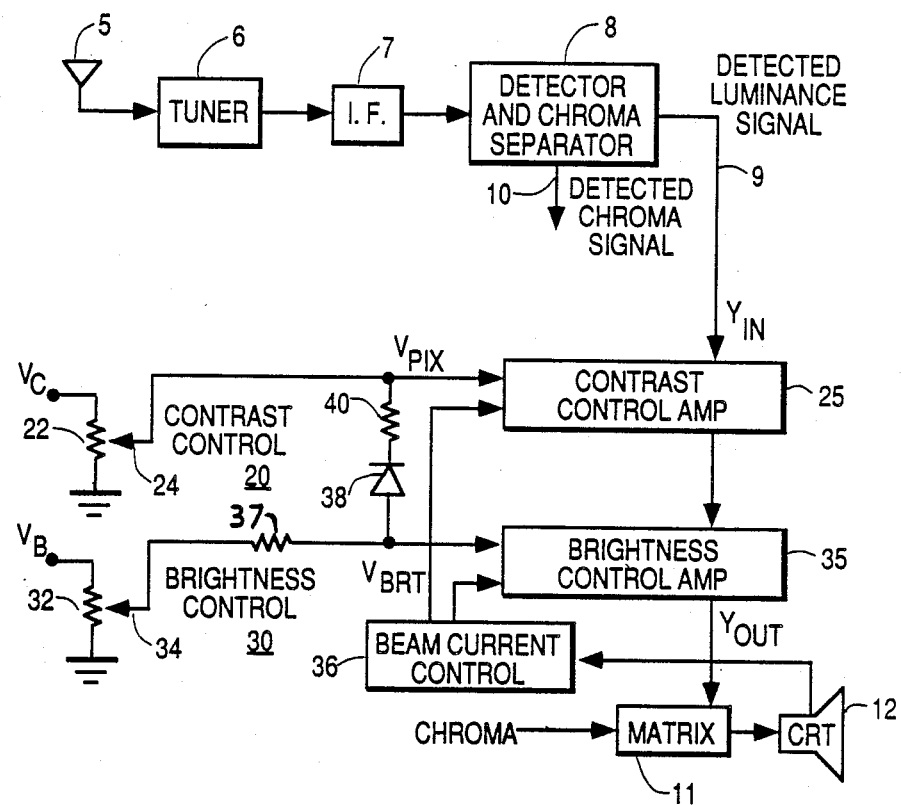
FIG. 2 is a schematic representation of one circuit embodiment according to aspects of the present invention.

FIG. 2 shows a schematic of one embodiment for implementing the transfer function of FIG. 1. Generally speaking, a television signal received by an antenna 5 or other appropriate source of signal such as a cable system, is processed by a tuner 6, intermediate frequency (IF) amplifier 7 and detector 8 with the luminance signal at 9 being separated from the chroma signal at 10. The luminance and chroma signals are appropriately processed and combined in matrix 11 for driving CRT 12. The luminance signal processing typically includes amplification and signal processing to implement various luminance signal attributes such as contrast and brightness.

A contrast control unit 20 comprises a potentiometer 22 coupled between an appropriate source of voltage $V_c$ and ground with a position variable wiper arm 24 for varying the voltage output $V_{pix}$ representative of a contrast or picture control setting. The picture control voltage $V_{pix}$ is coupled to a contrast control amplifier 25 in the luminance (Y) processing channel. In a corresponding manner, a brightness control unit 30 comprises a potentiometer 32 coupled between an appropriate source of voltage $V_b$ and ground with a position variable wiper arm 34 for varying the voltage output $V_{brt}$ representative of a brightness control setting. Brightness control voltage $V_{brt}$ is coupled to a brightness control amplifier 35 in the luminance processing channel. Contrast control amplifier 25 and brightness control amplifier 35 are standard implementations commonly used in television receivers for respectively controlling contrast and brightness. Beam limiter control circuit 36 senses the beam current of CRT 12 and in response to a beam current exceeding a threshold value, effects contrast control amplifier 25 and brightness control amplifier 35 for reducing contrast and/or brightness to reduce beam current in a manner common in the art. As discussed hereinabove, in this manner, the present invention reduces the requirements placed upon the beam limiter.

A non-linear device, e.g. shown as a diode 38, is coupled between arm 34 of brightness control unit 30 and arm 24 of contrast control unit 20 and is poled for conduction from brightness control unit 30 to contrast control unit 20. Until the non-linear device 38 starts to conduct, the brightness control and contrast control operate independently of each other. An isolation resistor 36 is coupled between brightness control 30 and the anode of diode 38. A voltage divider resistor 40, coupled in series with diode 38, will be discussed more fully hereinafter. For the present, it will be assumed that resistor 40 is bypassed.

Diode 38 will conduct when the forward bias voltage from anode (coupled to $V_{brt}$) to cathode (coupled to $V_{pix}$) exceeds the threshold for the device, which for silicon is about 0.55 volts. Accordingly, as control wiper 34 is positioned for increasing brightness control voltage $V_{brt}$, at some threshold voltage related to contrast control voltage $V_{pix}$, (i.e., at 0.55 volts plus $V_{pix}$) diode 38 will conduct thereby clamping $V_{brt}$ to the threshold voltage and prevent $V_{brt}$ from rising further. This limits the maximum that $V_{brt}$ can rise thus reducing the maximum brightness the image can be adjusted to. Since $V_{pix}$ is an adjustable voltage, the higher $V_{pix}$ is set (i.e., the higher the contrast), the higher $V_{brt}$ can be set and the higher the maximum brightness of the image. Conversely, th lower $V_{pix}$ is set, the lower is the maximum $V_{brt}$ can be set and the lower the maximum brightness of the image.

In the case just described, without resistor 40, $V_{brt}$ is rigidly clamped when diode 38 is conducting and the family of brightness transfer function curves would have a slope of zero beyond the variable threshold voltage (depending on the position of contrast control 20). Resistor 40 is an optional resistor permitting a slope of increased voltage of greater than zero but less than the slope of transfer function portion 11. In such a case, once diode 38 conducts, a voltage drop is developed across resistor 40 and any change in the setting of brightness control 30 results in a change in $V_{brt}$ which is the change in the setting of brightness control 30 attenuated by the voltage division of resistor 37 and 40 (with $V_{pix}$ and the anode to cathode voltage across diode 38 being constant). Thus, the resistance ratio between resistors 37 and 40 determines the slope of increase of $V_{brt}$ for family of transfer function curves of FIG. 1.

Figure 3:
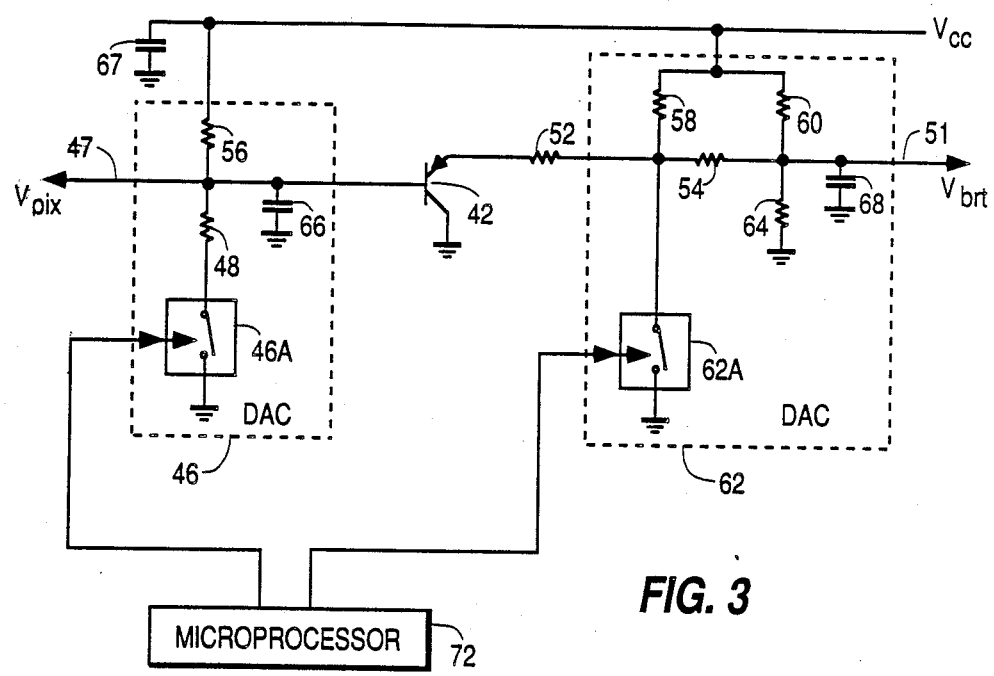
FIG. 3 is a schematic representation of another circuit embodiment according to aspects of the present invention.

The control of brightness level adapted to control of picture level can also be implemented in a embodiment including digital-to-analog converters (DAC) 46 and 62 for generating the contrast and brightness control voltages, specially appropriate to digital control of luminance processing as shown in FIG. 3.

PNP transistor 42, has a collector electrode coupled to ground, a base electrode coupled to a contrast control voltage $V_{pix}$ at output terminal 47 of a picture (pix) DAC 46, and an emitter electrode coupled to a brightness voltage $V_{brt}$ at output terminal 51. DAC 46 includes a switching device 46a controlled by the pulses of the binary rate or pulse width modulated pulse signal representing the pix control voltage. The base of transistor 42 is connected to the junction of a resistor 48 (which is coupled to ground through a switch 46a) and a resistor 56 (which is coupled to a power supply voltage $V_{cc}$). Capacitor 66 is a filter capacitor for DAC 46.

The emitter electrode of transistor 42 is coupled to output terminal 51 of DAC 62 through resistors 52 and 54. DAC 62 includes a switching device 62a similar in function to switching device 46a. The emitter electrode of transistor 42 is coupled to switch 62a, which is coupled to ground, and resistor 58 via resistor 52. Resistor 54 is coupled to the junction of a resistor 60 (which is coupled to $V_{cc}$) and resistor 64 (which is coupled to ground). Capacitor 68 is a filter capacitor for DAC 62, capacitor 67 is a power supply filter capacitor.

Contrast DAC switch 46a and brightness DAC switch 62a are often included in an integrated circuit, e.g., such as the MC68HC05TV1 manufactured by Motorola Co. The output circuits of this type of DAC typically are bipolar or MOS transistors, shown in FIG. 3 as switches 46a and 62a, switched between opened and closed conditions by pulses of a variable duty cycle or bit rate multiplier type pulse signal.

In FIG. 3, transistor 42 is a non-linear device with the base-emitter circuit having a conduction threshold corresponding to diode 38 of FIG. 2. Transistor 42 does not conduct until the base electrode is sufficiently forward biased for conduction. Below this threshold of conduction, the contrast and brightness controls operate independently of each other.

More particularly, the contrast control signal $V_{pix}$ developed by DAC 46 at 47 is applied to the base electrode. The brightness control signal $V_{brt}$ developed by DAC 62 at 51 and applied to the emitter electrode is modified by the shunting or loading action of transistor 42 in response to the voltage from DAC 46 applied at the base electrode. When the threshold of conduction of the base-emitter circuit is reached by the voltage developed by DAC 46, the collector-emitter circuit of transistor 42 starts to conduct and provides a variable shunt to ground. Since the emitter electrode of transistor 42 has a low output impedance, resistor 52 and the Thevenin equivalent output impedance of the brightness DAC switch 62a essentially determine the slope of the brightness control signal $V_{brt}$ above the breakpoint. However, transistor 42 of FIG. 3 provides improved isolation between the contrast and brightness circuits than does diode 38 of FIG. 2 while permitting $V_{pix}$ to still effect $V_{brt}$.

Figure 4:
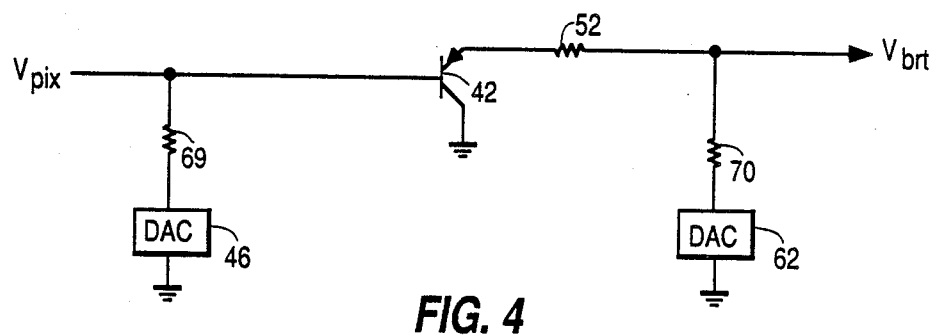
FIG. 4 is a schematic representation of the simplified circuit of FIG. 3.

A simplified version of the circuit of FIG. 3 is shown in FIG. 4 with resistor 69 representing the Thevenin output impedance of DAC 46 and resistor 70 representing the Thevenin output impedance of DAC 62. It should be noted that DACs 46 and 62 with their corresponding output 46a and 62a are only exemplary of possible digital implementations of the system disclosed herein. It is also within the contemplation of the present invention that in a digital system the video signal is converted to digital format and is digitally proccesed. While the interaction between the contrast and brightness controls has been explained by way of example in terms of analog circuitry including a non-linear device, the interaction can be performed under digital, including software control, by means of a microprocessor such microprocessor 72 of FIG. 3. These and other modifications are contemplated to be within the scope of the following claims.

What is claimed is:

1. In a television receiver including a source of video signal a visual display device, and process means for processing said video signal before application to said visual display device including contrast processing means for controlling the contrast of a reproduced image and brightness processing means for controlling the brightness of the reproduced image, a control system comprising:
    brightness control means coupled to said brightness processing means for adjusting the brightness of said reproduced image to a desired brightness level between a maximum brightness level and a minimum brightness level,
    contrast control means coupled to said contrast processing means for adjusting the contrast of said reproduced image to a desired contrast level between a maximum contrast level and a minimum contrast level, and
    means coupled to said contrast control means and said brightness control means for controlling said maximum brightness level in direct relationship to the adjusted level of contrast.

2. The television receiver of claim 1 wherein the means coupled to said brightness control means and contrast control means comprises a non-linear device.

3. The television receiver of claim 1 wherein at least one of the brightness control means and the contrast control means comprises potentimeter means.

4. The television receiver of claim 3 wherein the means coupled to said brightness control means and contrast control means comprises a non-linear device.

5. The television receiver of claim 1 wherein at least one of the brightness control means and the contrast control means comprises a digital switching means.

6. The television receiver of claim 5 wherein the digital switching means comprises a digital-to-analog converter.

7. The television receiver of claim 6 wherein the means coupled to said brightness control means and contrast control means comprises a non-linear device.

8. The television receiver of claim 1 wherein the means coupled to said brightness control means and contrast control means comprises a software controlled digital processing means.

9. The television receiver of claim 8 wherein the software controlled digital processing means comprises a microprocessor.

10. The television receiver of claim 1 wherein the brightness control means, contrast control means, and means coupled to the contrast control means and the brightness control means comprise a software controlled digital processing means.

11. The television receiver of claim 10 wherein the software controlled digital processing means comprises a microprocessor.

12. In a television receiver including a source of video signal, a visual display device, and process means for processing said video signal before application to said visual display device including contrast processing means for controlling the contrast of reproduced image and brightness processing means for controlling the brightness of the reproduced image, a control system comprising:
    brightness control means coupled to said brightness processing means for adjusting the brightness of said reproduced image to a desired brightness level between a maximum brightness level and a minimum brightness level,
    contrast control means coupled to said contrast processing means for adjusting the contrast of said reproduced image to a desired contrast level between a maximum contrast level and a minimum contrast level, and
    means for changing the maximum brightness level in direct relationship to the adjusted level of contrast.

13. The television receiver of claim 12 wherein the means for changing comprises a non-linear device.

14. The television receiver of claim 12 wherein at least one of the brightness control means and the contrast control means comprises potentiometer means.

15. The television receiver of claim 14 wherein the means for changing comprises a non-linear device.

16. The television receiver of claim 12 wherein at least one of the brightness control means and the contrast control means comprises digital switching means.

17. The television receiver of claim 16 wherein the digital switching means comprises a digital-to-analog converter.

18. The television receiver of claim 17 wherein the means for changing comprises a non-linear device.

19. The television receiver of claim 12 wherein the means for changing comprises a software controlled digital processing means.

20. The television receiver of claim 19 wherein the software controlled digital processing means comprises a microprocessor.

21. The television receiver of claim 12 wherein the brightness control means, contrast control means, and means for changing comprise a software controlled digital processing means.

22. The television receiver of claim 21 wherein the software controlled digital processing means comprises a microprocessor.

23. In a television receiver including a source of video signal, a visual display device, and process means for processing said video signal before application to said visual display device including contrast processing means for controlling the contrast of a reproduced image and brightness processing means for controlling the brightness of the reproduced image, a control system comprising:

brightness control means coupled to said brightness processing means for adjusting the brightness of said reproduced image to a desired brightness level between a maximum brightness level and a minimum brightness level, contrast control means coupled to said contrast processing means for adjusting the contrast of said reproduced image to a desired contrast level between a maximu contrast level and a minimum contrast level, and means for changing the maximum brightness level in direct relationship to the adjusted level of contrast, the means for changing comprising a non-linear device, at least one of the brightness control means and the contrast control means comprising a digital-to-analog converter.

24. In a television receiver including a source of a video signal, a visual display device, and process means for processing said video signal before application to said visual display device including contrast processing means for controlling the contrast of a reproduced image and brightness processing means for controlling the brightness of the reproduced image, a control system comprising:

brightness control means coupled to said brightness processing means for adjusting the brightness of said reproduced image to a desired brightness level between a maximum brightness level and a minimum brightness level, contrast control means coupled to said contrast processing means for adjusting the contrast of said reproduced image to a desired contrast level between a maximum contrast level and a minimum contrast level, means coupled to said contrast control means and said brightness control means for controlling said maximum brightness level in direct relationship to the adjusted level of contrast, and beam limiting means coupled to the visual display and at least one of the contrast processing means and the brightness processing means for sensing the beam current in the visual display device and reducing the beam current above a predetermined threshold by effecting the at least one of the contrast processing means and the brightness processing means.

* * * * *